United States Patent [19]

Seaton

[11] 4,293,223

[45] Oct. 6, 1981

[54] METHOD AND APPARATUS FOR CONTROLLING RESONANT FREQUENCY OF AN OPTICAL INTERFEROMETER CAVITY

[76] Inventor: Norman T. Seaton, 5431 College Ave., Oakland, Calif. 94618

[21] Appl. No.: 79,324

[22] Filed: Sep. 27, 1979

[51] Int. Cl.[3] .............................................. H01S 3/086
[52] U.S. Cl. ................................ 356/352; 331/94.5 C
[58] Field of Search .................... 356/352; 331/94.5 C

[56] References Cited

U.S. PATENT DOCUMENTS

| 2,830,489 | 4/1958 | Mitchell et al. | 356/352 |
| 3,582,212 | 6/1971 | Hesse et al. | 356/352 |
| 3,909,132 | 9/1975 | Barrett | 356/352 X |
| 4,147,424 | 4/1979 | Foster et al. | 356/352 |

*Primary Examiner*—Conrad J. Clark
*Assistant Examiner*—Matthew W. Koren
*Attorney, Agent, or Firm*—Manfred M. Warren; Robert B. Chickering; Glen R. Grunewald

[57] ABSTRACT

An apparatus and method for controlling the resonant frequency of an optical interferometer cavity having a part having a dimension defining the resonant frequency. An electrical conductor adapted for connection to a source of electrical potential is mounted on and mechanically secured to the part of the cavity which has the dimension defining the resonant frequency. The electrical conductor provides a conduction path substantially parallel to the frequency defining dimension of the aforementioned cavity part and has a coefficient of thermal expansion. Mechanical force is transmitted to the aforementioned cavity part as a function of electrothermally induced change in the length of the electrical conductor, thus causing a change in the resonant frequency of the cavity.

11 Claims, 4 Drawing Figures

METHOD AND APPARATUS FOR CONTROLLING RESONANT FREQUENCY OF AN OPTICAL INTERFEROMETER CAVITY

BACKGROUND OF THE INVENTION

1. Field of Invention

The invention relates to methods and apparatus for controlling the resonant frequency of optical interferometer cavities and more particularly to laser frequency control.

2. Description of Prior Art

In the field of optics there are many instances in which the scientist wants to effect precisely controlled changes in the physical dimensions of optical interferometer cavities. In this field, control of distances down to $10^{-5}$ microns can have significance. In the past, four types of electro-mechanical transducers were used to produce these dimensional changes and thus alter the resonant frequency of optical interferometer cavities. The four categories of prior art electro-mechanical transducers are discussed below:

A. Electromagnetic. This type of transducer generates a force through the interaction of a current-carrying coil and a magnetic field. The forces produced by these transducers are generally small compared to the other categories, and while these small forces can produce considerable extension in a high compliance system, they are generally insufficient to meet the requirements for controlling a rigid structure such as a laser tube. For this reason electromagnetic transducers seem to have found little application in interferometry or laser frequency control systems.

B. Magnetostrictive. These transducers use the current in a magnetizing coil to expand or shrink a solid magnetic material. Invar is generally used when expansion is desired and nickel when shrinkage is desired. This type of transducer has been used to control the mirrors in a laser cavity but has a relatively limited range (at best 60 micro inches per inch or 0.6 microns per centimeter) and has problems associated with magnetic hysterisis. This latter property, whereby it is possible to have one of two different positions (depending on prior history) for a given magnetizing current, makes the application of magnetostriction very impractical in any kind of servo-control system.

C. Electrothermal. These transducers use electrical current to develop heat in a resistance element which, in turn, brings about thermal expansion of an attached structure. Examples of this technique as applied to laser cavities are the coils, either helical or bifilar helical (no magnetic field), wound around the laser tube itself to control the length of the tube and hence the output frequency of the laser. This type of transducer is capable of producing relatively large extensions, depending, of course, on the permissible temperature range and the expansion coefficient of the structure to which it is applied.

The use of electrothermal transducers is by far the least expensive means of producing controlled changes in the dimensions of optical interferometer cavities and has the added advantage that it can be easily tailored to operate with all common voltage/current supplies. It has the disadvantage, however, of not only requiring power, but being relatively slow in its response time. Before any heat can begin to be transferred to the requisite attached structure, the heater itself must begin to warm up. In response to a step increase in heater power, the extension of the structure will thus initially increase only as a quadratic function of time, at best. Indeed where a helically wound heater coil is firmly bonded to the substrate tube structure the initial heating and expansion of the coil will bring about an expansion of the substrate tube diameter and, through the inverse Poisson effect, a reduction in its length, until a transfer of heat to the substrate reverses this trend and increases the tube length. Even after the heater power is returned by a step decrease to normal, heat will continue to flow into the structure and extend it, until the temperature of the heater is no longer above that of the substrate structure. This type of electrothermal transducer is thus difficult to use in any servosystem because of overshoot or oscillation. Settling times are generally of the order of seconds at best.

D. Piezoelectric. These transducers utilize special materials which contract in length when an electric field is applied. They consume no power and therefore produce no heat and these transducers are capable of extremely fast response. Piezoelectric transducers have found wide application in the optical industry. Their principal drawbacks are high cost and limited sensitivity (typically $5 \times 10^{-3}$ microns per volt, 0.2 microinches per volt), so that the voltages up to 1 kilovolt are often used for appreciable motion. Because they produce a displacement that is a linear function of the voltage applied to them with a frequency response that extends into the low kHz region, they have found a wide application in servo-control systems.

SUMMARY OF THE INVENTION

The method and apparatus of the present invention uses what is best described as a direct electrothermal transducer to produce changes in the physical dimensions of optical interferometer cavities. Unlike the conventional electrothermal transducers heretofore described, the direct electrothermal transducer of the instant invention, hereinafter abbreviated DETT, does not depend on the conduction of heat to the structure of the optical interferometer cavity in order to bring about its expansion. The transducer of the instant invention will operate without any thermal conduction to the cavity at all. The DETT depends instead on a tight mechanical coupling between the structure of the cavity and a thermally expandable electrical conductor or conductors which run parallel to the desired direction of expansion. The DETT has a number of desirable properties which result in greatly improved stability and precision in the control of the resonant frequencies of optical interferometer cavities to which the transducer is applied.

Another feature of the present invention is to provide an electromechanical transducer which has a servosettling time far less than those of ordinary electrothermal transducers, while still providing relatively large extensions.

Another object of the present invention is to provide a transducer which, through the choice of wire size and material, can easily be tailored to operate with all common voltage/current supplies.

A still further object of the present invention is to provide a transducer which is noninductive, nonmagnetic, and of low mass in order to minimize changes in self-resonant frequency or the deflection of optical interferometer cavities to which they are applied.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF THE INVENTION

Figure 3:
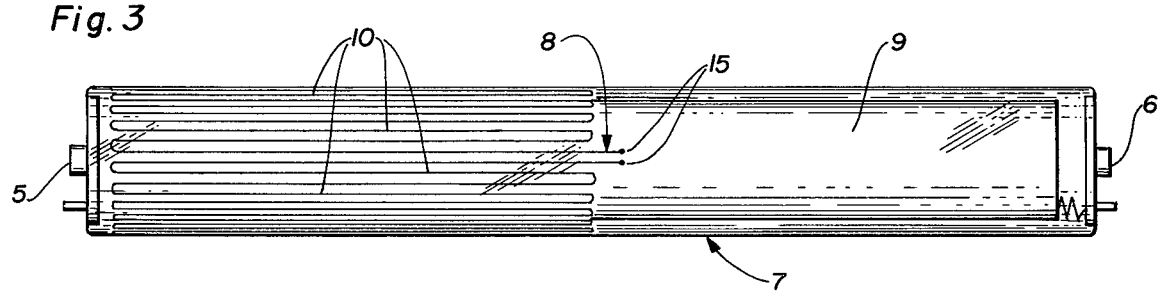
FIG. 3 is a side elevation of a laser tube embodying the apparatus of the instant invention.

The apparatus of the instant invention comprises, briefly, a dimensional control device for an optical interferometer cavity. The most common type of interferometer cavity suitable for use with the instant invention is the laser tube. As seen in FIG. 3, the longitudinal dimension of the glass envelope controls the distance between the maximum reflector 5 and the output mirror 6, thus defining the resonant frequency of the tube 7. The longitudinal dimension of the glass envelope is controlled by an electrical conductor 8 adapted for connection to a source of electrical potential and mounted on and mechanically secured to the wall 9. The conductor 8 provides a conduction path which is substantially parallel to the longitudinal dimension of the wall 9. The conductor has a coefficient of thermal expansion and by virtue of its tight mechanical coupling to the wall, functions to transmit mechanical force to the wall as a function of electro-thermally induced change in the length of the conductor. This force causes a small change in the longitudinal dimension of the laser tube, thus causing a change in the resonant frequency and hence the output frequency of the laser.

Figure 1:
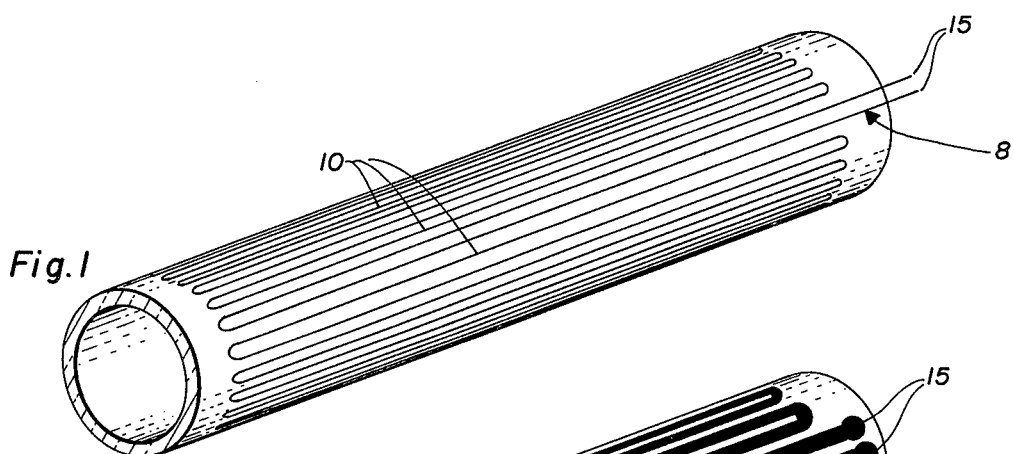
FIG. 1 is a cross-sectional perspective view of an apparatus constructed in accordance with the present invention.

In the preferred embodiment, as illustrated in FIG. 1, the electrical conductor 8 is seen to comprise a plurality of substantially straight electrical conductors 10 connected in series and mounted on the wall of the interferometer cavity substantially parallel to the longitudinal axis. The conductors are mounted in substantially, uniformly circumferentially spaced relation on the wall. By continuously bonding the conductors over their entire length to the wall, uniform transmission of electrothermally-generated mechanical force is assured.

Figure 2:
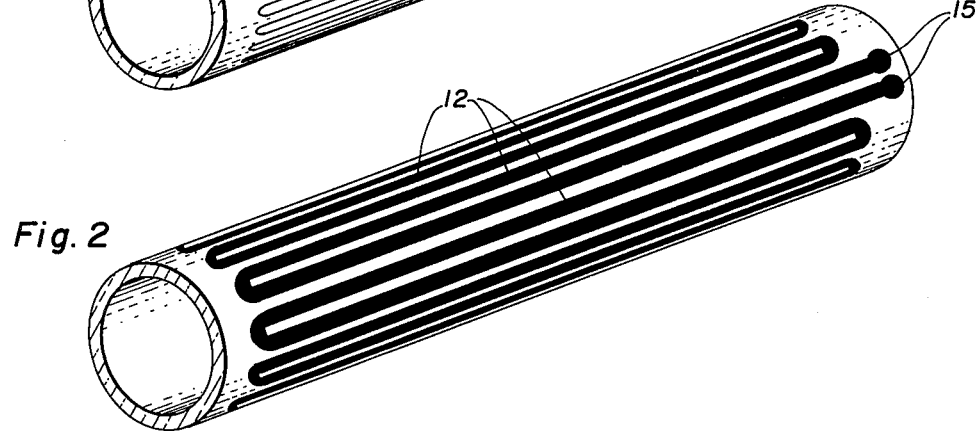
FIG. 2 is a cross-sectional perspective view of a modified form of the invention.

In an alternative embodiment, as illustrated in FIG. 2, the electrical conductor comprises a preformed conductive ribbon 12 which can be cemented to the interferometer cavity wall. By the use of printed circuit etching techniques, such a conductor can be easily fabricated on a sheet of plastic which is subsequently wrapped around and adhesively bonded to the interferometer cavity wall.

The apparatus of the present invention can also be constructed by winding a single wire lengthwise, as shown in FIGS. 1 and 3, on a cylindrical sleeve which is dimensioned to encircle a wall of a laser tube. The wire is bonded to the sleeve and the combination is mounted in encircling engagement and bonded to the wall. A series connection of the parallel conductors 10, as afforded by winding a single wire 8 lengthwise and supplying current to the two ends 15, allows for simple construction and provides desirable current consumption characteristics. Various combinations or series and parallel connections may also be employed with satisfactory results so long as the configurations provide substantially symmetrical generation of electrothermally-induced, longitudinally-directed force in the conductors.

The operation of the apparatus of the instant invention can best be explained by examining the embodiment illustrated in FIG. 3. An insulated current-carrying wire 8, positioned as shown, is tightly bonded by an adhesive or potting compound to the substrate laser tube wall 9 to provide tight mechanical coupling and to prevent the conductor from buckling under expansion stresses. Means 15 is provided for connecting the conductor to a source of electrical potential. The passage of an electrical current through the wire generates heat and causes an expansion in length. A fraction of this expansion is transferred to the substrate laser tube wall 9, thus causing an extension in dimension and a resultant change in laser output frequency. The fraction of the force transmitted is a function of the longitudinal compliance of the wire conductor and the longitudinal compliance of the substructure laser tube. In response to a step application of electrical power to the instant apparatus the length of the substructure laser tube changes initially as a linear function of time in contradistinction to the aforementioned quadratic response exhibited by the ordinary helically wound electrothermal transducers. The response of the apparatus is linear with power ($I^2R$) and not current or voltage. For this reason it is often desirable to provide a power linearizing element in the circuitry which drives the apparatus.

In the case of the wire ribbon the conduction of heat to the substrate structure plays a progressively increasing role in its extension because there is less mass to such conductors and therefore a more rapid rise in surface temperature under a step increase in applied power. If the apparatus is to be used with an interferometer cavity whose substrate structure is fragile (glass, quartz) over a considerable temperature range, then it is necessary to reasonably match the expansion coefficients of the conductor material and the substrate. For instance, while copper wire is satisfactory on glass over a limited temperature range, a wide temperature range would require the use of molybdenum wire to avoid fracturing the glass under tension.

What is claimed is:

1. A frequency control apparatus for an optical interferometer cavity having a part having a dimension defining resonant frequency comprising:
   a plurality of substantially straight electrical conductors adapted for connection to a source of electrical potential and mounted on and mechanically secured to said part and providing a conduction path substantially parallel to said dimension and having a coefficient of thermal expansion and functioning to transmit mechanical force to said part as a function of electro-thermally induced change in length of said conductors for changing said resonant frequency.

2. The structure of claim 1 wherein said optical interferometer cavity comprises a laser tube having a wall providing said part; and
   said conduction path is substantially parallel to the longitudinal axis of said tube.

3. The structure of claim 2, said electrical conductors mounted on said wall substantially parallel to said axis with said conductors mounted in substantially uniformly circumferentially spaced relation on said wall.

4. The structure of claim 2, said electrical conductors connected in series and mounted on said wall substantially parallel to said axis with said conductors mounted in substantially uniformly circumferentially spaced relation on said wall.

5. The structure of claim 2, said electrical conductors connected in parallel and mounted in substantially uniformly circumferentially spaced relation on said wall.

6. The structure of claim 2, said electrical conductors connected in series-parallel and mounted in substantially uniformly circumferentially spaced relation on said wall.

7. The structure of claim 3 and an electrically conductive surface relieved to define said conductors and mounted on and bonded to said wall.

8. The structure of claim 3, said conductors being substantially continuously bonded over their length to said wall.

9. The structure of claim 2 and a sleeve mounted in encircling engagement on said wall; and
said conductors comprising a wire wound lengthwise on and distributed evenly around and bonded to said sleeve with at least one of said wire and sleeve bonded to said wall.

10. A method of controlling the resonant frequency of an optical interferometer cavity having a part having a dimension defining resonant frequency comprising:
   a. mechanically securing to said part a plurality of substantially straight electrical conductors having a coefficient of thermal expansion and having a conduction path substantially parallel to said dimension and having means for connection to a source of electrical potential;
   b. generating a mechanical force by connecting said conductors to a source of electrical potential thus causing an electro-thermally induced change in length of said conductors; and
   c. transmitting said mechanical force to said part thus changing said dimension.

11. The method of claim 11 wherein said optical interferometer cavity comprises a laser tube having a wall providing said part with said electrical conductors mounted on said wall substantially parallel to the longitudinal axis of said tube and in substantially uniformly circumferentially spaced relation on said wall said conductors being substantially continuously bonded over their length to said wall for transmitting their change-in-length force to said wall.

* * * * *